United States Patent
Wright

(10) Patent No.: US 9,864,382 B2
(45) Date of Patent: Jan. 9, 2018

(54) SMART HEATER CONTROL FOR AN AIR DRYER

(71) Applicant: NEW YORK AIR BRAKE, LLC, Watertown, NY (US)

(72) Inventor: Eric C. Wright, Evans Mills, NY (US)

(73) Assignee: NEW YORK AIR BRAKE, LLC, Watertown, NY (US)

( * ) Notice: Subject to any disclaimer, the term of this patent is extended or adjusted under 35 U.S.C. 154(b) by 79 days.

(21) Appl. No.: 15/155,125

(22) Filed: May 16, 2016

(65) Prior Publication Data

US 2017/0329354 A1 Nov. 16, 2017

(51) Int. Cl.
 *B01D 53/26* (2006.01)
 *G05D 7/06* (2006.01)
 *F16K 31/00* (2006.01)
 *B01D 53/04* (2006.01)

(52) U.S. Cl.
 CPC ....... *G05D 7/0635* (2013.01); *B01D 53/0454* (2013.01); *B01D 53/261* (2013.01); *F16K 31/002* (2013.01); *B01D 2257/80* (2013.01); *B01D 2259/402* (2013.01); *B01D 2259/40003* (2013.01)

(58) Field of Classification Search
 CPC .. B01D 53/04; B01D 53/0454; B01D 53/261; B01D 2257/80; B01D 2259/402; B01D 2259/40003; G05D 7/0635; F16K 31/002
 USPC ........... 95/14, 18, 90, 96, 117; 96/112, 121; 34/472, 473, 80
 See application file for complete search history.

(56) References Cited

U.S. PATENT DOCUMENTS

| 4,601,114 | A |   | 7/1986 | Noguchi |
| 4,718,020 | A |   | 1/1988 | Duich et al. |
| 5,604,991 | A |   | 2/1997 | Castle et al. |
| 5,901,464 | A | * | 5/1999 | Kazakis ................ B01D 45/16 34/562 |
| 2017/0088110 | A1 | * | 3/2017 | Wright ................ B60T 17/004 |
| 2017/0089481 | A1 | * | 3/2017 | Wright ................ B60T 17/006 |

FOREIGN PATENT DOCUMENTS

| DE | 19700243 | 4/1998 |
| EP | 2428418  | 3/2012 |

OTHER PUBLICATIONS

International Search Report Form PCT/ISA/220, International Application No. PCT/US2016/032635, pp. 1-12, dated Mar. 28, 2017.

* cited by examiner

*Primary Examiner* — Frank Lawrence
(74) *Attorney, Agent, or Firm* — Bond Schoeneck & King, PLLC; David Nocilly

(57) ABSTRACT

An air dryer having a heater element associated with its valves to prevent freezing at cold temperatures. The air dryer includes a temperature sensor and an electronic controller that reads the temperature sensor during normal operations and selectively opens and closes certain of the valves when the temperature falls below a predetermined threshold to enter a safe mode that avoids freezing of the valves during operation. If an exhaust valve is open when safe mode is entered, the corresponding inlet valve is closed, both of the exhaust valves are closed, and the other inlet valve if opened. If an exhaust valve is not open, both inlet valves are opened and both exhaust valves are closed.

8 Claims, 5 Drawing Sheets

SMART HEATER CONTROL FOR AN AIR DRYER

BACKGROUND OF THE INVENTION

1. Field of the Invention

The present invention relates to railway air system air dryers and, more particularly, to an air dryer having a heating control system for preventing freezing of valves.

2. Description of the Related Art

A typical "twin-tower" desiccant-type air dryer includes two drying circuits that are controlled by valves. Wet inlet air flows through one circuit to remove water vapor, while dry product air counter flows through the other circuit to remove the accumulated water and regenerate the desiccant. Inlet and exhaust valves for each pneumatic circuit are responsive to controlling electronics to switch the air flow between the two circuits so that one circuit is always drying while the other is regenerating. For example, when inlet A is open, exhaust A is closed, inlet B is closed, and exhaust B is open for the duration of the regeneration cycle, but otherwise closed. Likewise, when inlet B is open, exhaust B is closed, inlet A is closed, and exhaust A is open for the duration of the regeneration cycle, but otherwise closed.

The air dryer valves are constantly subjected to wet air and thus prone to freezing at low temperatures. Because the two sets of inlet and exhaust valves are independently controlled, it is possible for an inlet valve and an exhaust valve in the same circuit to be simultaneously open if either or both of the inlet and exhaust valves freeze open. When the inlet and exhaust valves are simultaneously open, the main locomotive reservoir will vent and the locomotive air compressor will have insufficient capacity to overcome the air loss. In a second scenario, although the inlet valves are normally open (no power), it is possible that one or both of these valves might freeze closed. If both inlet valves are simultaneously closed, then all flow through the dryer is blocked.

In order to counteract this problem, a heater element may be provided to warm the valves sufficiently to prevent freezing. At start-up, a controller determines the temperature of the valve block. If the valve block temperature is less than a predetermined temperature, such as 5 degrees C., then the controller turns on the heater and delays powering of any of the two sets of the normally open inlet valves and the normally closed exhaust valves until such time that the valve block temperature is equal to or greater than the predetermined temperature. In a conventional approach, this evaluation only occurs at initial start-up and it is therefore assumed that the heater and controller will maintain the valve block temperature above the predetermined temperature and freezing will not occur. In practice, however, the heater may not have enough power to maintain the valve block above the predetermined temperature when ambient temperatures are very and the air high flow rate is high due to the substantial heat loss to the cold inlet air flow through the dryer. As a result, even though the heater may successfully warm the valve block at a cold temperature start-up, the valve block may drop below freezing during high flow operations so that the inlet and exhaust valves can freeze and resulting in the problems described above. Accordingly, there is a need for a heater control system that can address the problem of conditions that cause freezing of the valves after initial start-up based on subsequent operating condition.

BRIEF SUMMARY OF THE INVENTION

The present invention includes an air dryer having an inlet for receiving compressed air, a pair of inlet valves and a corresponding pair of exhaust valves positioned in a valve block for controlling the movement of the compressed air through a corresponding pair of desiccant towers, a heater configured to warm the valve block, a temperature sensor for outputting a signal indicating the temperature of at least a portion of the air dryer; and a controller piloting the series of valves. The controller is programmed to determine whether one of the pair of exhaust valves is open when the temperature falls below a predetermined threshold and if so, to close the corresponding one of the pair of inlet valves, close both of the exhaust valves, and open the other of the pair of inlet valves. The controller is also programmed to open both inlet valves and close both exhaust valves if one of the pair of exhaust valves is not open when the temperature falls below the predetermined threshold. The air dryer may include a drain valve associated with a pre-filtration stage and, if so, the controller is programmed to close the drain valve when the temperature falls below the predetermined threshold.

The present invention also includes a method of preventing frozen air dryer valves for an air dryer having an inlet for receiving compressed air, a pair of inlet valves and a corresponding pair of exhaust valves positioned in a valve block for controlling the movement of the compressed air through a corresponding pair of desiccant towers, a heater configured to warm the valve block, a temperature sensor for outputting a signal indicating the temperature of at least a portion of the air dryer, and a controller piloting the series of valves. The method involves receiving the signal indicating the temperature of the air dryer from the temperature sensor, determining whether the temperature of the air dryer has fallen below a predetermined threshold, determining whether one of the pair of exhaust valves is open when the temperature falls below a predetermined threshold, and closing the corresponding one of the pair of inlet valves, closing both of the exhaust valves, and opening the other of the pair of inlet valves if one of the pair of exhaust valves is open when the temperature falls below a predetermined threshold. The method may further include the step of opening both inlet valves and closing both exhaust valves if one of the pair of exhaust valves is not open when the temperature falls below the predetermined threshold. If the air dryer includes a drain valve associated with a pre-filtration stage, the method may include the step of closing the drain valve when the temperature falls below the predetermined threshold.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
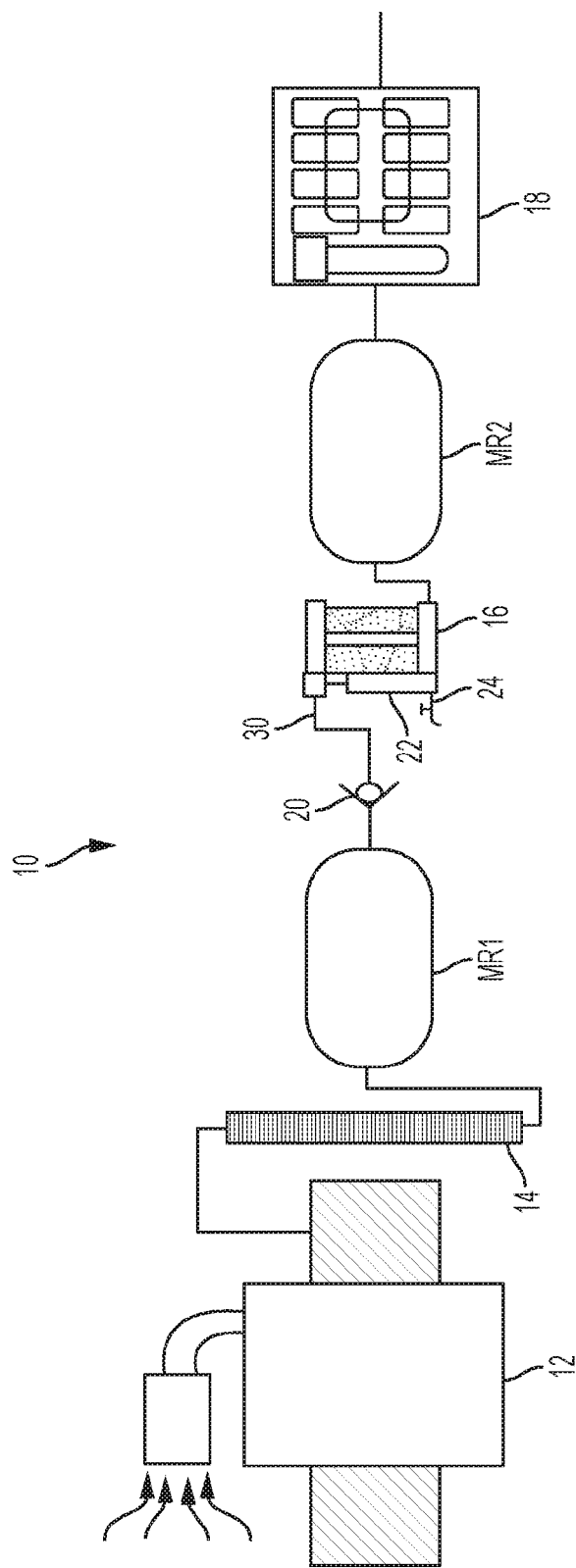
FIG. 1 is a schematic of a locomotive air supply system having an air dryer having a heated valve block according to the present invention.

Referring now to the drawings, wherein like reference numerals refer to like parts throughout, there is seen in FIG. 1 a locomotive air system 10 having an air compressor 12, aftercooler 14, first and second main reservoirs MR1 and MR2, and a two-tower desiccant air dryer 16 having heater control according to the present invention, as more fully described below. Second main reservoir MR2 is coupled to the braking system 18 and a check valve 20 is positioned between the first and second main reservoirs MR1 and MR2. A pre-filtration stage 22 is associated with air dryer 16 and includes a drain valve 24 that is operated according to a drain valve purge cycle time.

Figure 2:
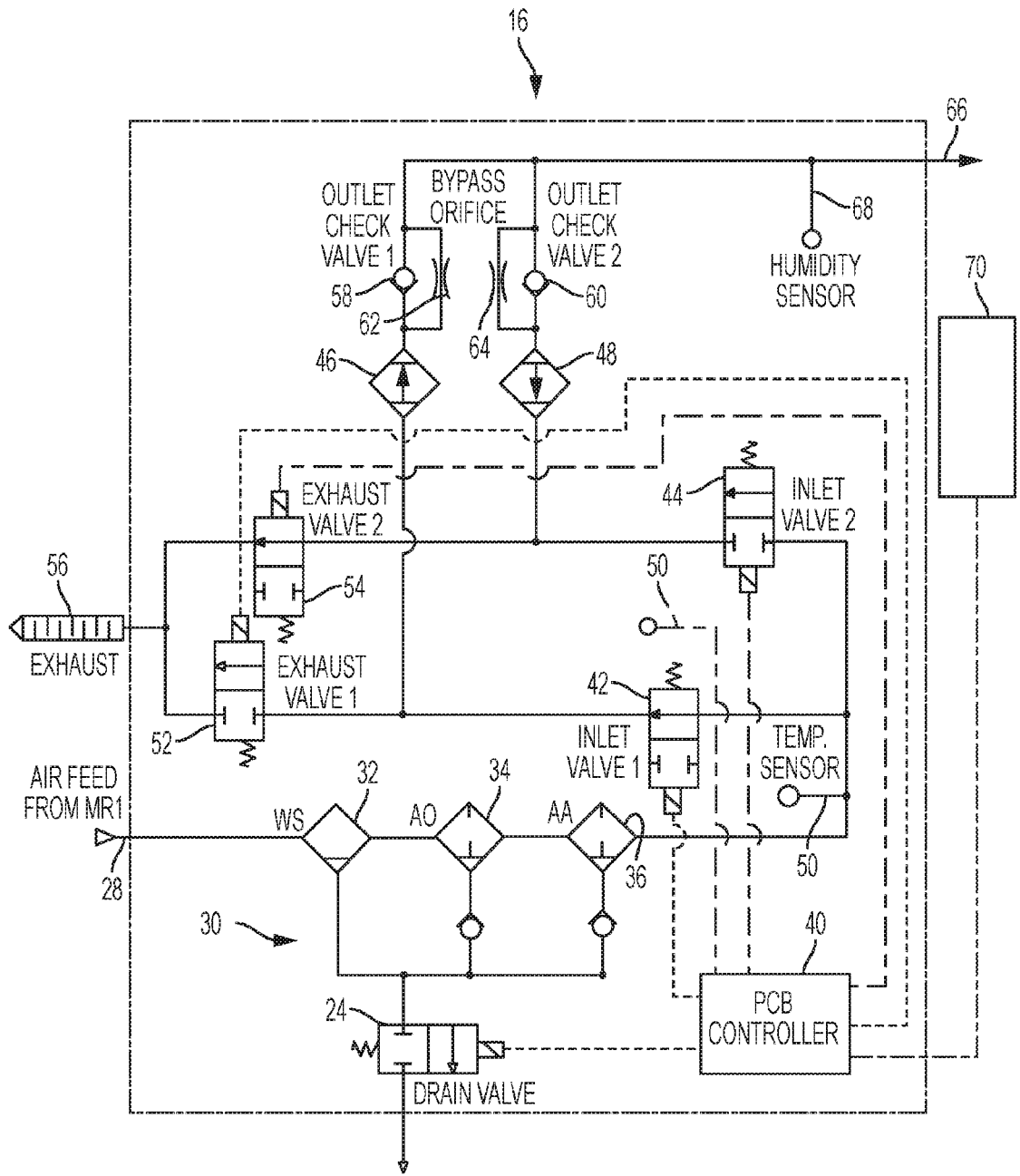
FIG. 2 is a schematic of an air dryer with integral pre-filtration stage and a heated valve block according to the present invention.

Referring to FIG. 2, two-tower desiccant air dryer 16 comprises an inlet 28 for receiving air from first main reservoir MR1. Inlet 28 is in communication with pre-filtration stage 30, shown as comprising a water separator 32, a coarse coalescer 34, and a fine coalescer 36. Any accumulated liquids in water separator 32, coarse coalescer 34, and fine coalescer 36 are expelled through drain valve 24. A pair of inlet valves 42 and 44 are positioned downstream of pre-filtration stage 30 for diverting incoming air between one of two pathways, each of which is associated with one of two desiccant towers 46 and 48. A temperature sensor 50 is positioned upstream of inlet valves 42 and 44 and downstream of pre-filtration stage 30. Optionally, the temperature, or a second temperature sensor may be located in the valve block housing the series of valves. The first pathway downstream of first inlet valve 42 leads to an exhaust valve 52 and first desiccant tower 46. The second pathway downstream of second inlet valve 44 leads to a second exhaust valve 54 and second desiccant tower 48. The first pathway further includes a first check valve 58 and first bypass orifice 62 downstream of first desiccant tower 46, and the second pathway further includes a second check valve 60 and bypass orifice 64 downstream of second desiccant tower 48. A single outlet 66 is coupled to the end of the first and second pathways, and a humidity sensor 68 is positioned upstream of outlet 66. Inlet valves 42 and 44 and exhaust valves 52 and 54 are piloted by controller 40. Controller 40 operates inlet valves 42 and 44 and exhaust valves 52 and 54 so that compressed air provided at inlet 28 is directed through one of desiccant towers 46 or 48 for drying. The other of desiccant towers 46 or 28 may be regenerated by allowing dried air to reflow through bypass orifice 62 or 64 and out of exhaust valve 52 or 54 as needed. Controller 40 is also in communication with temperature sensor 50 and humidity sensor 68. A heating element 70 may also be coupled to controller 40 and positioned in air dryer 16 to warm drain valve 24, inlet valves 42 and 44 and exhaust valves 52 and 54 if the temperature is below freezing.

Figure 3:
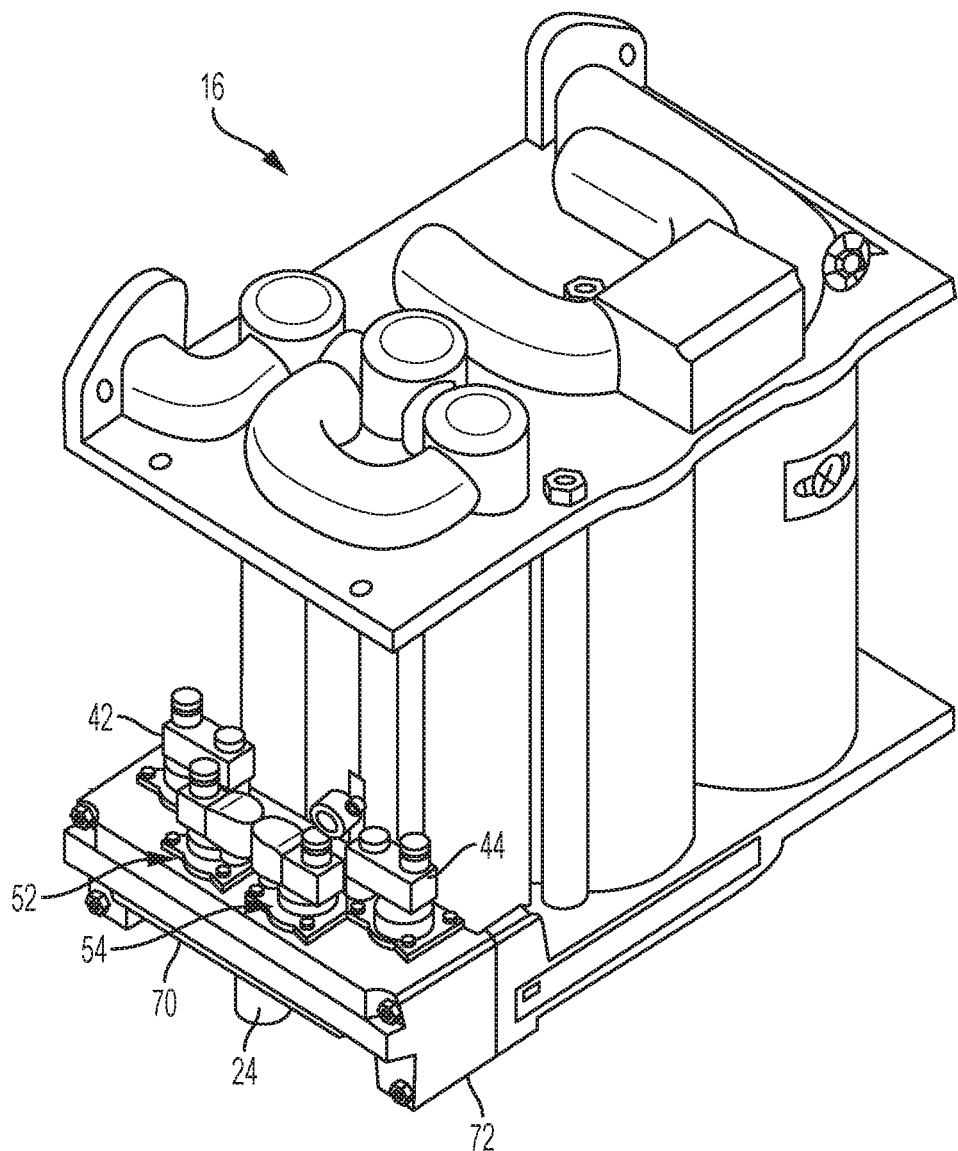
FIG. 3 is a schematic of a heated valve block of an air dryer with pre-filtration state according to the present invention.

As seen in FIG. 3, the air dryer pathways seen in FIG. 1 are arranged so that drain valve 24, inlet valves 42 and 44, and exhaust valves 52 and 54 are commonly located along with heater element 70 in a valve block 72. As explained above, air dryer 16 includes temperature sensor 50 for determining the approximate temperature of valve block 72 and thus drain valve 24, inlet valves 42 and 44, and exhaust valves 52 and 54. Temperature sensor 76 is shown as being positioned to detect the temperature of air passing through air dryer 16, but may be positioned to detect the temperature of valve block 72, the temperature of the inlet air, the temperature of ambient air, or some combination of the above.

Figure 4:
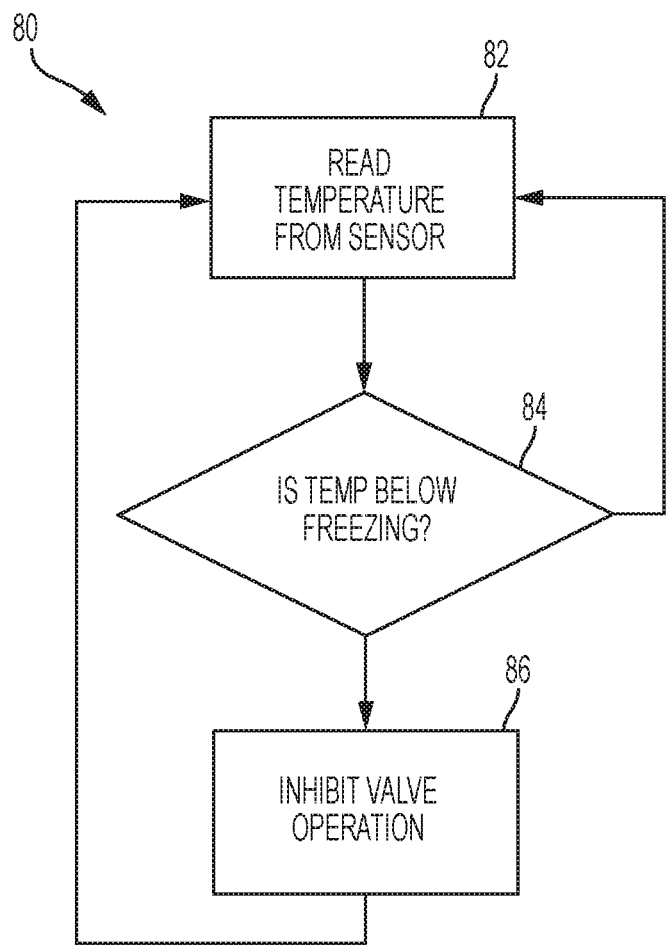
FIG. 4 is a flowchart of a start-up heater control process for an air dryer having a heated valve block.

Referring to FIG. 4, air dryer controller 40 is programmed to implement a start-up heater control process 80 to ensure that valve block 72 is sufficiently heated to a temperature that avoids the likelihood that drain valve 24, inlet valves 42 and 44, or exhaust valves 52 and 54 can become frozen. First, controller 40 reads the temperature 82 such as by using temperature 76 positioned in valve block 72. Next, a check 84 is performed to determine whether the temperature is below freezing (or any other predetermined temperature selected to be indicative of a risk that drain valve 24, inlet valves 42 and 44, or exhaust valves 52 and 54 will become frozen). If the temperature is below the threshold at check 84, controller 40 inhibits valve operation 86, such as by inhibiting the operation of drain valve 24, inlet valves 42 and 44, and/or exhaust valves 52 and 54 until such time as the temperature has risen above the threshold. Thus, if air dryer 16 is turned on after an extended cold soak at low temperature, controller 40 will affirmatively inhibit actuation of drain valve 24, inlet valves 42 and 44, and/or exhaust valves 52 and 54 until heater element 70 has warmed valve block 72 sufficiently to prevent any of drain valve 24, inlet valves 42 and 44, and exhaust valves 52 and 54 from freezing in an open position and causing an undesired venting of compressed air from locomotive air supply system 10. Preferably, inlet valves 42 and 44 are normally open and exhaust valves 52 and 54 are normally closed in the unpowered state, so that compressed air may flow through air dryer 16 to MR2 when all valves are in an unpowered state. By using closed loop temperature feedback control to inhibit the operation of the series of valves, the start-up time for a cold air dryer is proportional to the starting temperature. Alternatively, a simple system which uses a fixed time delay calculated to allow the valve block to warm to above freezing for the worst case condition may be provided.

The same sensor and controller may be used to turn off the heater, when the temperature of the valve block is at or above the target temperature, thus regulating the temperature of the valve block to a temperature above freezing when the ambient temperature is below freezing; and turning the heater off completely when the ambient temperature, as indicated by the temperature of the valve block, is above freezing.

Figure 5:
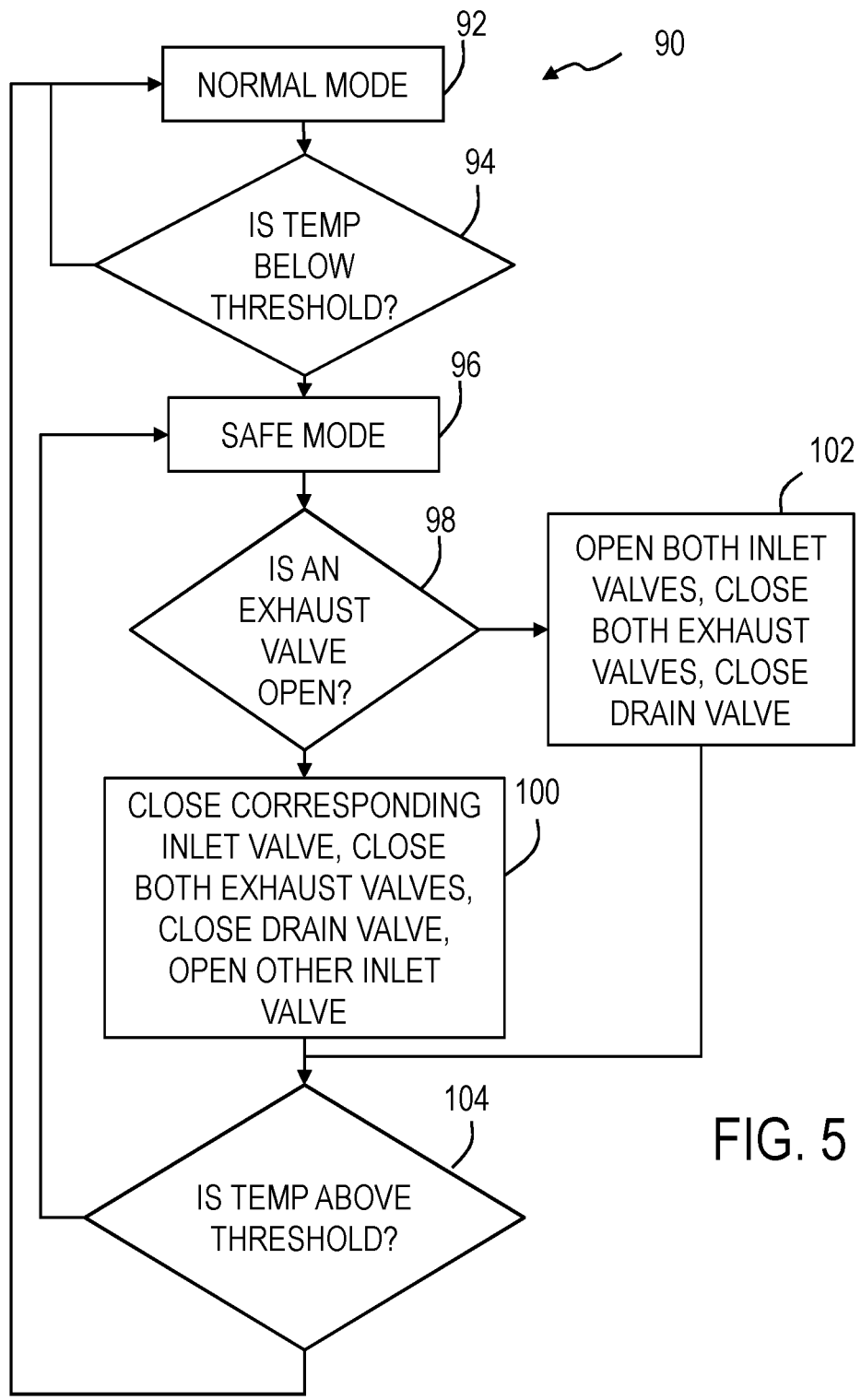
FIG. 5 is a flowchart of a normal operation heater control process according to the present invention for an air dryer having a heated valve block.

Referring to FIG. 5, air dryer controller 40 is programmed to implement a normal operations heater control process 90 after initial start-up to address the potential for freezing during normal air dryer operations. Process 90 is designed to prevent air dryer 16 from freezing in an unsafe state, such as when inlet valve 42 or 44 and corresponding exhaust valve 52 or 54 in the same circuit are simultaneously open or when both inlet valves 42 and 44 are simultaneously closed. This unsafe state is more likely to occur when the valve block temperature drops below a predetermined threshold temperature indicating a risk of freezing (such as 5 degrees C.), as might occur when there is a high flow of very cold air through dryer 16 that exceeds the ability of heater 70 or if there is a failure of heater 70.

Process 90 begins when air dryer 16 has been in normal mode 92 after a successful start-up (valve block temperature is above the predetermined threshold as explained above). A check 94 is performed to determine whether the valve block temperature has dropped below drops the predetermined threshold. If not, air dryer remains in normal operational mode and control returns. If so, process 90 places air dryer 16 into a safe mode 96 as described herein. Once safe mode 96 is entered, a check 98 is made to determine whether one of the exhaust valves 52 or 54 is open. If so, the corresponding inlet valve 42 or 44 is closed, exhaust valves are closed, pre-filtration drain valve 24 is closed, and the other inlet valve 42 or 44 is opened at step 100. In normal operations, for example, if initially inlet 1 is open, exhaust 1 is closed, inlet 2 is closed and exhaust 2 is open. If controller 40 enters safe mode from this state, controller 40 will cause inlet 1 is stay open, exhaust 1 to stay closed, inlet 2 to stay closed and exhaust 2 to close. Even if exhaust 2 has frozen open, the relevant circuit is closed by keeping inlet 2 closed. It should be recognized that, as seen in FIG. 2, inlet valves 42 and 44 are normally open and thus energized by controller 40 to close, and exhaust valves 52 and 54 are normally closed and thus energized by controller 40 to open. If check 98 determines that neither exhaust valve 52 nor 54 is open, then both inlet valves 42 and 44 are opened, exhaust valves 52 and 54 are closed, and pre-filtration drain valve 24 is closed. Air may thus flow through both pneumatic circuits, minimizing the possibility that air flow through air dryer 16 is blocked due to ice buildup.

After the appropriate valves have been opened or closed at step 100 or 102, a check 106 is performed to identify whether valve block 72 has warmed above the predetermined threshold temperature. If not, air dryer 16 stays in safe mode 96. If so, safe mode 96 is exited and normal mode 92 restored. Normal mode 92 operations may be dependent on the circumstances of check 98. For example, if air dryer 16 entered safe mode 96 with one exhaust valve open (as determined at step 98), when the temperature of valve block 72 temperature warms to greater than the threshold temperature, controller 40 may resume normal operation of the particular cycle that was interrupted by process 90. If the dryer entered safe mode with both exhaust valves closed (as determined at step 98), when the temperature of valve block 72 warms to greater than the threshold, controller 40 may perform a normal start-up, such as by commanding a fixed two minute cycle on circuit 1 followed by a fixed two minute cycle on circuit 2. Controller 40 will then allow dryer 16 to resume normal operations (if the safe mode was used for an extended time, both desiccant beds may be in need of regeneration). Alternatively, when safe mode 96 is triggered, check 98 can be omitted and step 102 performed. Thus, both inlet valves 42 and 44 are opened, both exhaust valves 52 and 54 are closed, and drain valve 24 is closed regardless of the prior state of the exhaust valves 52 and 54. Otherwise, control logic remains the same as described herein.

What is claimed is:

1. An air dryer, comprising;
    an inlet for receiving compressed air;
    a pair of inlet valves and a corresponding pair of exhaust valves positioned in a valve block for controlling the movement of the compressed air through a corresponding pair of desiccant towers;
    a heater configured to warm the valve block;
    a temperature sensor for outputting a signal indicating the temperature of at least a portion of the air dryer; and
    a controller piloting the series of valves that is programmed to determine whether one of the pair of exhaust valves is open when the temperature falls below a predetermined threshold and if so, to close the corresponding one of the pair of inlet valves, close both of the exhaust valves, and open the other of the pair of inlet valves.

2. The air dryer of claim 1, wherein the controller is programmed to open both inlet valves and close both exhaust valves if one of the pair of exhaust valves is not open when the temperature falls below the predetermined threshold.

3. The air dryer of claim 2, includes the air dryer includes a drain valve associated with a pre-filtration stage.

4. The air dryer of claim 3, wherein the controller is programmed to close the drain valve when the temperature falls below the predetermined threshold.

5. A method of preventing frozen air dryer valves, comprising the steps of:
    providing an air dryer having an inlet for receiving compressed air, a pair of inlet valves and a corresponding pair of exhaust valves positioned in a valve block for controlling the movement of the compressed air through a corresponding pair of desiccant towers, a heater configured to warm the valve block, a temperature sensor for outputting a signal indicating the temperature of at least a portion of the air dryer, and a controller piloting the series of valves;
    receiving the signal indicating the temperature of the air dryer from the temperature sensor;
    determining whether the temperature of the air dryer has fallen below a predetermined threshold;
    determining whether one of the pair of exhaust valves is open when the temperature falls below a predetermined threshold; and
    closing the corresponding one of the pair of inlet valves, closing both of the exhaust valves, and opening the other of the pair of inlet valves if one of the pair of exhaust valves is open when the temperature falls below a predetermined threshold.

6. The method of claim 5, further comprising the step of opening both inlet valves and closing both exhaust valves if one of the pair of exhaust valves is not open when the temperature falls below the predetermined threshold.

7. The method of claim 6, wherein the air dryer includes a drain valve associated with a pre-filtration stage.

8. The method of claim 7, further comprising the step of closing the drain valve when the temperature falls below the predetermined threshold.

* * * * *